US009567011B2

(12) United States Patent
Joest et al.

(10) Patent No.: US 9,567,011 B2
(45) Date of Patent: Feb. 14, 2017

(54) STIFFENING ARRANGEMENT FOR A FORWARD STRUCTURE OF A MOTOR VEHICLE

(71) Applicant: Dr. Ing. h.c. F. Porsche Aktiengesellschaft, Stuttgart (DE)

(72) Inventors: Rainer Joest, Vaihingen/Enz. (DE); Jozsef Petrovics, Leonberg (DE); Frank Bechtler, Stuttgart (DE); Jochen Pflueger, Weissach (DE); Philipp Kriener, Stuttgart (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 14/822,945

(22) Filed: Aug. 11, 2015

(65) Prior Publication Data

US 2016/0052553 A1 Feb. 25, 2016

(30) Foreign Application Priority Data

Aug. 19, 2014 (DE) ........................ 10 2014 111 794

(51) Int. Cl.
*B62D 21/15* (2006.01)
*B62D 21/11* (2006.01)
*B62D 25/08* (2006.01)

(52) U.S. Cl.
CPC ............. *B62D 21/152* (2013.01); *B62D 21/11* (2013.01); *B62D 25/082* (2013.01)

(58) Field of Classification Search
CPC ... B62D 25/082; B62D 25/084; B62D 25/088; B62D 21/152; B62D 21/11
(Continued)

(56) References Cited

U.S. PATENT DOCUMENTS 7,766,420 B2 8/2010 Maruyama et al.
9,260,138 B1 * 2/2016 Briceno ............... B62D 25/088
(Continued)

FOREIGN PATENT DOCUMENTS

DE 102006008667 9/2007
DE 102011102434 11/2012
(Continued)

OTHER PUBLICATIONS

Machine Translation of DE102012222561, printed from the EPO website on Apr. 4, 2016.*
German Search Report dated Mar. 18, 2015.

*Primary Examiner* — Jason S Morrow
(74) *Attorney, Agent, or Firm* — Gerald E. Hespos; Michael J. Porco; Matthew T. Hespos

(57) ABSTRACT

A stiffening arrangement (22) for a forward structure (10) of a motor vehicle has a mounting bracket (20) for mounting a motor vehicle radiator. A shear field (24) is connected to the mounting bracket (20) to dissipate shear forces. A right stiffening strut (28) connects the shear field (24) to a right suspension-strut dome (16) and supports the mounting bracket (20) on the right suspension-strut dome (16), and a left stiffening strut (30) connects the shear field (24) to a left suspension-strut dome (18) and supports the mounting bracket (20) on the left suspension-strut dome (18). Thus, a major part of the crumple zone of the forward structure (10) provided for a frontal crash can be utilized, so that the risk of damage to engine components in an engine bay of the forward structure (10) is reduced and vibrational comfort for the driver is improved.

9 Claims, 1 Drawing Sheet

16 42 26 22 44 18 10 32 34 36 38 36 38 28 α 30 12 40 40 24 40 20 14

(58) Field of Classification Search
USPC .............. 296/187.09, 193.09, 193.1, 203.02; 280/784; 180/68.4
See application file for complete search history.

(56) References Cited

U.S. PATENT DOCUMENTS

| | | | | |
|---|---|---|---|---|
| 2005/0121875 | A1* | 6/2005 | Noble .................... | B60G 15/07 280/124.109 |
| 2008/0150326 | A1* | 6/2008 | Maruyama ........... | B62D 25/082 296/192 |
| 2013/0161978 | A1* | 6/2013 | Herntier ................. | B62D 25/08 296/193.09 |
| 2015/0115664 | A1* | 4/2015 | Mildner ............... | B62D 25/082 296/203.02 |
| 2015/0314811 | A1* | 11/2015 | Shibata ................ | B62D 25/082 296/193.09 |

FOREIGN PATENT DOCUMENTS

| | | |
|---|---|---|
| DE | 102012208903 | 11/2013 |
| DE | 102012222561 | 6/2014 |
| DE | 102013215217 | 2/2015 |

* cited by examiner

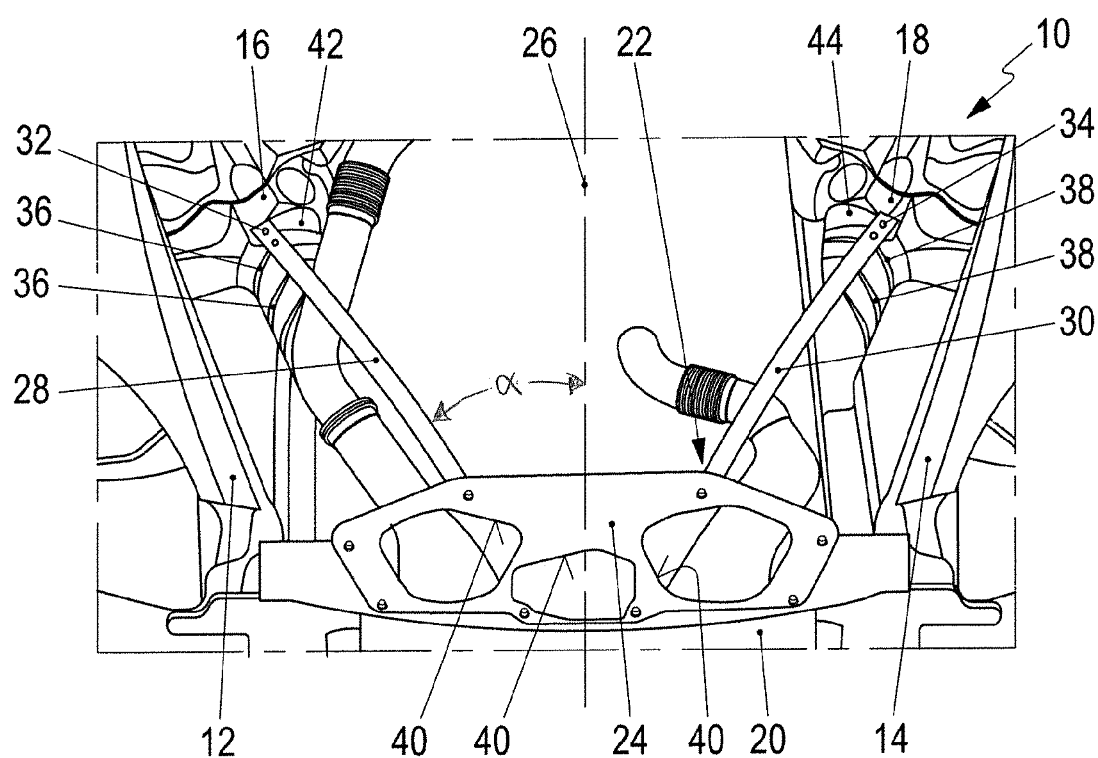
10
16
42
26
22
44
18
32
34
36
38
36
38
30
28
α
12
40
40
24
40
20
14

STIFFENING ARRANGEMENT FOR A FORWARD STRUCTURE OF A MOTOR VEHICLE

CROSS REFERENCE TO RELATED APPLICATION

This application claims priority under 35 USC 119 to German Patent Appl. No. 10 2014 111 794.8 filed on Aug. 19, 2014, the entire disclosure of which is incorporated herein by reference.

BACKGROUND

1. Field of the Invention

The invention relates to a stiffening arrangement for a forward structure of a motor vehicle for preventing damage to engine components in an engine bay of the forward structure in the event of a crash, and/or for preventing vibrations of the forward structure to improve vibrational comfort.

2. Description of the Related Art

U.S. Pat. No. 7,766,420 discloses a bracket for a radiator grille to be supported by obliquely running supporting struts on suspension-strut domes of a forward structure of a motor vehicle.

There is a constant demand to prevent damage to engine components in an engine bay of the forward structure and to improve vibrational comfort for the driver.

Objects of the invention are to reduce the risk of damage to engine components in the forward structure and to improve vibrational comfort for the driver.

SUMMARY

The invention relates to a stiffening arrangement for a forward structure of a motor vehicle. The stiffening arrangement has a mounting bracket for mounting a vehicle radiator on the front. The stiffening arrangement also has a shear field that is connected to the mounting bracket and that functions to dissipate sheer forces. A right stiffening strut is connected to the shear field and is connectable to a right suspension-strut dome for supporting the mounting bracket on the right suspension-strut dome. A left stiffening strut is connected to the shear field and is connectable to a left suspension-strut dome for supporting the mounting bracket on the left suspension-strut dome.

The mounting bracket may be connected by a right connecting strut to a right longitudinal member and/or by a left connecting strut to a left longitudinal member. The right longitudinal member and the left longitudinal member may be part of a load-bearing support structure of the motor vehicle body of the motor vehicle. The left suspension-strut dome may be connected to the left longitudinal member, and/or the right suspension-strut dome may be connected to the right longitudinal member. The mounting bracket, the shear field and the stiffening struts thus form cooperate with the longitudinal members to form a ring structure via which forces can be dissipated. The functional elements of the stiffening arrangement thus form a stiffening frame via which forces of intense loads can be dissipated without damaging engine components of a motor vehicle engine that are arranged within the ring-like frame. Vibrations of the forward structure can be prevented to a correspondingly greater extent, thereby improving vibrational comfort for a driver of the motor vehicle.

Forces that act in the event of a crash are so intense that deformation of components of the forward structure is inevitable. However, the shear field can be deformed before the stiffening struts and/or or the mounting bracket buckle. Thus, the shear field can distribute the forces between the stiffening struts in the event of an oblique impact of the forward structure against an obstruction so that the loads are homogenized. In this case, the shear field can deform plastically, if necessary, so that the impact energy can be dissipated by the plastic deformation of the shear field. The shear field can be deformed in the event of a crash by a distance in the longitudinal direction of the motor vehicle for plastically deforming the crash boxes between the mounting bracket and the longitudinal members. Accordingly, the shear field can achieve a longitudinal deformation with a longitudinal displacement of the mounting bracket even in the event of an oblique impact of the forward structure in the event of a crash. Therefore, a major part of the crumple zone of the forward structure provided for a frontal crash can be utilized, so that the risk of damage to engine components in an engine bay of the forward structure is reduced. The stiffened forward structure also improves vibrational comfort for the driver.

The first stiffening strut and/or the second stiffening strut may run oblique to a longitudinal direction of the motor vehicle. In this way, dissipation of forces acting transverse to the direction of travel of the motor vehicle can be improved.

The first stiffening strut and/or the second stiffening strut may enclose an acute angle $\alpha$ with a longitudinal direction of the motor vehicle, where $20° \leq \alpha \leq 70°$, in particular $30° \leq \alpha \leq 60°$, preferably $40° \leq \alpha \leq 50°$ and particularly preferably $\alpha = 45° \pm 5°$. The stiffening struts thus run substantially diagonally with respect to the longitudinal direction. In this way, high force components running transverse to the longitudinal direction can be dissipated to the suspension-strut domes.

The shear field may be more easily plastically deformable in the direction of travel than the stiffening struts and/or the mounting bracket. In this way, the shear field can, if necessary, be deformed plastically between the stiffening struts and the mounting bracket. Thus, buckling or fracture of the stiffening struts and/or of the mounting bracket can be prevented.

The shear field may have at least one opening for setting the force dissipation behavior and the deformation behavior of the shear field. The openings may be punched out of a metal sheet to form the shear field. In particular, suitable predetermined buckling points can be provided in the event of correspondingly high acting forces.

In relation to an overall area $A_{ges}$, delimited by an outer edge of the shear field and pointing substantially in a vertical direction of the shear field, the sum of the opening areas of the openings A0 is defined as follows: $0.20 \leq A_0/A_{ges} \leq 0.80$, in particular $0.30 \leq A_0/A_{ges} \leq 0.70$ and preferably $0.40 \leq A_0/A_{ges} \leq 0.60$. In this way, the shear field can be made up of several unipartite frame elements. This results in a weight-saving lightweight construction.

The invention also relates to a forward structure for a motor vehicle having a right suspension-strut dome for the movable mounting of a right shock-absorbing damper for a right front wheel, and having a left suspension-strut dome for the movable mounting of a left shock-absorbing damper for a left front wheel, and having a stiffening arrangement that may be designed and refined as described above, connected to the right suspension-strut dome and to the left suspension-strut dome. The shear field ensures a deformation in a longitudinal direction even in the event of an oblique impact of the forward structure in the event of a crash for to be realized. Thus, a major part of the crumple zone of the forward structure provided for a front-end crash can be utilized so that the risk of damage to engine components in an engine bay of the forward structure is reduced and stiffening of the forward structure, improves the vibrational comfort for the driver.

In particular, the right suspension-strut dome has a right abutment for abutment against an end side, pointing away from the mounting bracket, of the right stiffening strut, and/or the left suspension-strut dome has a left abutment for abutment against an end side, pointing away from the mounting bracket, of the left stiffening strut. Thus, the forces that are dissipated in the longitudinal direction of the stiffening struts in the event of a crash can be introduced into the respective suspension-strut dome at the end side as well as via connecting means that connect the stiffening struts to the suspension-strut domes. Shearing of the connecting means in the event of a crash can thereby be prevented.

The right stiffening strut may be fastened to the right suspension-strut dome by a right connecting means that is oriented substantially in vertically, and the left stiffening strut may be fastened to the left suspension-strut dome by a left connecting means that is oriented substantially vertically. The fastening of the stiffening struts to the respectively associated suspension-strut dome during the assembly process can thereby be simplified. In particular, the fastening can be performed by an assembly robot.

The right suspension-strut dome may have at least one right stiffening rib below the right stiffening strut in a vertical direction. Thus, the right stiffening strut overlaps at least a part of the right stiffening rib in a vertical view. Similarly, the left suspension-strut dome may have at least one left stiffening rib below the left stiffening strut in a vertical direction. Thus, the left stiffening strut overlaps at least a part of the left stiffening rib in a vertical view. The suspension-strut domes additionally can be stiffened the stiffening struts for the dissipation of the forces introduced via the stiffening struts. The stiffening struts may in this case be arranged, in an installation space-saving manner, at least partially below the respective stiffening struts in a vertical elongation of the stiffening struts.

The invention will be discussed by way of example below with reference to the appended drawing and on the basis of a preferred exemplary embodiment, wherein the features presented below may constitute an aspect of the invention both in each case individually and in combination.

BRIEF DESCRIPTION OF THE DRAWINGS

FIG. 1 shows a schematic plan view of a forward structure of a motor vehicle.

DETAILED DESCRIPTION

The forward structure 10 illustrated in FIG. 1 has a right longitudinal member 12 and a left longitudinal member 14. A left suspension-strut dome 16 is connected to the left longitudinal member, whereas a right suspension-strut dome 18 is connected to the right longitudinal member. A mounting bracket 20 of a stiffening arrangement 22 is connected to the right longitudinal member 12 and to the left longitudinal member 14.

The stiffening arrangement 22 has a shear field 24 that is connected to the mounting bracket 20 and to which, in turn, there are connected right and left stiffening struts 28, 30 that run substantially diagonally with respect to a longitudinal direction 26, The right stiffening strut 28 of the stiffening arrangement 22 is connected to the right-hand suspension-strut dome 16 by way of vertically running right connecting element 32. The left stiffening strut 30 of the stiffening arrangement 22 is connected to the left suspension-strut dome 18 by way of vertically running left connecting means 34. The right and left stiffening struts 28, 30 each may enclose an acute angle α with a longitudinal direction 26 of the motor vehicle, where $20° \leq \alpha \leq 70°$, in particular $30° \leq \alpha \leq 60°$, preferably $40° \leq \alpha \leq 50°$ and particularly preferably $\alpha = 45° \pm 5°$. Thus, the stiffening struts 28, 30 run substantially diagonally with respect to the longitudinal direction 26. In this way, high force components running transverse to the longitudinal direction can be dissipated to the suspension-strut domes 16, 18.

The right suspension-strut dome 16 has multiple right stiffening ribs 36 that project in to a point below the right stiffening strut 28. The left suspension-strut dome 18 has multiple left stiffening ribs 38 that project in to a point below the left stiffening strut 30. It is furthermore possible that, at least in the event of a crash, the right stiffening strut 28 can be supported at the end on a right abutment 42 of the right suspension-strut dome 16 and the left stiffening strut 30 can be supported at the end on a left abutment 44 of the left-suspension-strut dome 18.

The shear field 24 has multiple openings 40. A ration of an overall area $A_{ges}$, delimited by an outer edge of the shear field 24 to the sum $A_0$ of the opening areas of the openings 40 is defined as follows: $0.20 \leq A_0/A_{ges} \leq 0.80$, in particular $0.30 \leq A_0/A_{ges} \leq 0.70$ and preferably $0.40 \leq A_0/A_{ges} \leq 0.60$. In this way, the shear field can be made up of several unipartite frame elements.

By means of the openings 40, it is for example possible for the behavior of the shear field 24 in the event of plastic deformation during a crash to be targetedly predefined.

What is claimed is:

1. A stiffening arrangement for a forward structure of a motor vehicle, comprising:

- a mounting bracket for the mounting of a motor vehicle radiator on the front side,
- a shear field connected to the mounting bracket and which serves for the dissipation of shear forces,
- a right stiffening strut connected to the shear field and to a right suspension-strut dome for supporting the mounting bracket on the right suspension-strut dome, and
- a left stiffening strut connected to the shear field and to a left suspension-strut dome and for supporting the mounting bracket on the left suspension-strut dome,
- wherein the shear field has a plurality of open areas, and, in relation to an overall area $A_{ges}$, delimited by an outer edge of the shear field, a sum of opening areas of the openings $A_0$ is defined as: $0.20 \leq A_0/A_{ges} \leq 0.80$.

2. The stiffening arrangement of claim 1, wherein the first stiffening strut and the second stiffening strut run obliquely with respect to a longitudinal direction of the motor vehicle.

3. The stiffening arrangement claim 2, wherein each of the first and second stiffening struts encloses an acute angle α with a longitudinal direction of the motor vehicle, where $20° \leq \alpha \leq 70°$.

4. The stiffening arrangement of claim 1, wherein the shear field is more easily plastically deformable in the direction of travel than the stiffening struts and the mounting bracket.

5. The stiffening arrangement of claim 1, wherein, in relation to the overall area $A_{ges}$, delimited by the outer edge of the shear field, the sum of the opening areas of the openings $A_0$ is defined as: $0.40 \leq A_0/A_{ges} \leq 0.60$.

6. A forward structure for a motor vehicle, having a right suspension-strut dome for movable mounting of a right shock-absorbing damper for a right front wheel, and a left suspension-strut dome for movable mounting of a left shock-absorbing damper for a left front wheel, and having the stiffening arrangement of claim 1 connected to the right suspension-strut dome and to the left suspension-strut dome.

7. The forward structure of claim 6, wherein the right suspension-strut dome has a right abutment for abutment against an end, pointing away from the mounting bracket, of the right-hand stiffening strut, and or the left suspension-strut dome has a left abutment for abutment against an end, pointing away from the mounting bracket, of the left stiffening strut.

8. The forward structure claim 7, wherein the right stiffening strut is fastened to the right suspension-strut dome by a right-hand connecting element that is oriented substantially vertically, and the left stiffening strut is fastened to the left suspension-strut dome by a left connecting means that is oriented substantially vertically.

9. The forward structure of claim 8, wherein the right suspension-strut dome has at least one right stiffening rib below the right stiffening strut in a vertical direction, the right-hand stiffening strut overlaps at least a part of the right stiffening rib in a vertical view, and the left suspension-strut dome has at least one left stiffening rib below the left stiffening strut in a vertical direction, the left stiffening strut overlaps at least a part of the left stiffening rib in a vertical view.

* * * * *